(12) United States Patent
Watanabe et al.

(10) Patent No.: US 10,877,188 B2
(45) Date of Patent: Dec. 29, 2020

(54) COMPOSITE DIFFUSER PLATE

(71) Applicant: KURARAY CO., LTD., Kurashiki (JP)

(72) Inventors: Junji Watanabe, Kamisu (JP); Masaru Karai, Kamisu (JP); Atsushi Uchida, Kamisu (JP)

(73) Assignee: KURARAY CO., LTD., Kurashiki (JP)

( * ) Notice: Subject to any disclaimer, the term of this patent is extended or adjusted under 35 U.S.C. 154(b) by 95 days.

(21) Appl. No.: 15/564,769

(22) PCT Filed: Apr. 7, 2016

(86) PCT No.: PCT/JP2016/001943
§ 371 (c)(1),
(2) Date: Oct. 6, 2017

(87) PCT Pub. No.: WO2016/163125
PCT Pub. Date: Oct. 13, 2016

(65) Prior Publication Data
US 2018/0113240 A1    Apr. 26, 2018

(30) Foreign Application Priority Data

Apr. 8, 2015 (JP) ................................ 2015-078995

(51) Int. Cl.
*G02B 5/02* (2006.01)
*G02B 3/00* (2006.01)
(Continued)

(52) U.S. Cl.
CPC ............. *G02B 5/0231* (2013.01); *G02B 3/00* (2013.01); *G02B 3/0043* (2013.01); *G02B 5/02* (2013.01);
(Continued)

(58) Field of Classification Search
CPC ...... G02B 5/0231; G02B 5/02; G02B 5/0268; G02B 5/0205–0221; G02B 5/0252;
(Continued)

(56) References Cited

U.S. PATENT DOCUMENTS

2002/0034014 A1    3/2002  Gretton et al.
2002/0034710 A1*   3/2002  Morris ................ G02B 3/0043
                                                        430/321

(Continued)

FOREIGN PATENT DOCUMENTS

CN          1386203 A       12/2002
CN          101164006        4/2008
(Continued)

OTHER PUBLICATIONS

International Search Report dated Jul. 12, 2016 in PCT/JP2016/001943 filed Apr. 7, 2016.
(Continued)

*Primary Examiner* — Jade R Chwasz
*Assistant Examiner* — Jyotsna V Dabbi
(74) *Attorney, Agent, or Firm* — Oblon, McClelland, Maier & Neustadt, L.L.P.

(57) ABSTRACT

A composite diffuser plate capable of inhibiting luminance unevenness from occurring locally is described. The composite diffuser plate includes a first diffuser plate and a second diffuser plate arranged in this order from an incident side. At least one of the first diffuser plate and the second diffuser plate is composed of a random microlens array including multiple microlenses. The microlenses include a plurality of parameters defining a lens shape. At least one of the plural parameters is randomly distributed. The random microlens array causes a phase difference to be generated in transmitted light.

9 Claims, 22 Drawing Sheets

(51) Int. Cl.
  *G03B 21/62* (2014.01)
  *G02F 1/1335* (2006.01)
(52) U.S. Cl.
  CPC .......... *G02B 5/0278* (2013.01); *G03B 21/62* (2013.01); *G02B 5/0268* (2013.01); *G02F 1/133504* (2013.01)
(58) Field of Classification Search
  CPC .. G02B 5/0273; G02B 5/0284; G02B 5/0263; G02B 3/0043; G02B 3/00; G02B 3/0006; G02B 3/0037; G02B 3/005; G02B 3/0062; G02B 3/0087; G02B 3/02; G03B 21/62; G03B 21/625; G02F 1/133504
  USPC .......................................................... 359/599
  See application file for complete search history.

(56) References Cited

U.S. PATENT DOCUMENTS

| | | | | |
|---|---|---|---|---|
| 2004/0130790 | A1* | 7/2004 | Sales | G02B 3/0043 359/619 |
| 2005/0122591 | A1 | 6/2005 | Parker et al. | |
| 2007/0103747 | A1 | 5/2007 | Powell et al. | |
| 2008/0138024 | A1 | 6/2008 | Parker et al. | |
| 2010/0135004 | A1 | 6/2010 | Epstein et al. | |
| 2010/0188858 | A1 | 7/2010 | Parker et al. | |
| 2011/0019128 | A1 | 1/2011 | Takata et al. | |
| 2011/0164321 | A1 | 7/2011 | Lee et al. | |
| 2011/0234942 | A1 | 9/2011 | Nakagome et al. | |
| 2012/0194914 | A1* | 8/2012 | Van Nijnatten | A01G 9/1438 359/599 |
| 2012/0218641 | A1 | 8/2012 | Kikuchi et al. | |
| 2013/0107543 | A1 | 5/2013 | Parker et al. | |
| 2015/0172610 | A1* | 6/2015 | Candry | G03B 21/142 353/85 |
| 2015/0293271 | A1* | 10/2015 | Miyasaka | H04N 9/3152 353/38 |
| 2015/0293273 | A1* | 10/2015 | Chen | G02B 5/0278 362/355 |

FOREIGN PATENT DOCUMENTS

| | | | |
|---|---|---|---|
| CN | 101978292 | | 2/2011 |
| CN | 101978293 | A | 2/2011 |
| JP | 2004-505306 | A | 2/2004 |
| JP | 2006-184560 | A | 7/2006 |
| JP | 2007-523369 | A | 8/2007 |
| JP | 2010-510546 | A | 4/2010 |
| JP | 2010-123436 | A | 6/2010 |
| JP | 2010-250037 | A | 11/2010 |
| JP | 2011-90299 | A | 5/2011 |
| JP | 2012-13755 | | 1/2012 |
| JP | 2012-226300 | A | 11/2012 |
| JP | 2013-73819 | A | 4/2013 |
| KR | 10-2008-0024836 | A | 3/2008 |
| WO | WO 02/10804 | A1 | 2/2002 |
| WO | WO 2010/032903 | A1 | 3/2010 |
| WO | 2012/117495 | A1 | 9/2012 |
| WO | WO-2014104106 | A1 * | 7/2014 .......... H04N 9/3152 |

OTHER PUBLICATIONS

Hakan Urey et al., "Microlens-array-based exit-pupil expander for full-color displays", Applied Optics, Aug. 10, 2005, vol. 44, No. 23, pp. 4930-4936.
Office Action dated Sep. 27, 2018 in Korean Patent Application No. 10-2017-7030511 (with unedited computer generated English translation), 8 pages.
Extended Search Report dated Nov. 6, 2018 in European Patent Application No. 16776296.2, 8 pages.
Chinese Office Action dated Apr. 29, 2019 in Chinese Application No. 201680020331.9 (with English Translation).
Office Action in corresponding Chinese Application No. 201680020331.9, dated Jan. 6, 2020. (w/English Translation).
Combined Chinese Office Action and Search Report dated Sep. 8, 2020 in Chinese Patent Application No. 201680020331.9 (with English translation of Office Action and English translation of Category of Cited Documents), 18 pages.

\* cited by examiner

COMPOSITE DIFFUSER PLATE

CROSS REFERENCE TO RELATED APPLICATIONS

This application is a 35 U.S.C. § 371 national stage patent application of international patent application PCT/JP2016/001943, filed Apr. 7, 2016, the entire disclosure of which is incorporated herein by reference, and claims the benefit of the Japanese Patent Application No. 2015-078995, filed Apr. 8, 2015, the entire disclosure of which is also incorporated herein by reference.

TECHNICAL FIELD

The present disclosure relates to a composite diffuser plate.

BACKGROUND ART

A technique has been suggested for applying a single diffuser plate such as a microlens array to a display apparatus.

For example, Patent Literature 1 describes an optical design method. In this optical design method, (a) shapes of microstructures such as microlenses formed on a substrate surface are defined; (b) locations of selected microstructures in an arrangement are specified; (c) an intensity distribution of diffused light is calculated; and (d) steps of (a) to (c) are repeated until a desired diffused light intensity distribution is obtained. Patent Literature 1 further suggests a single diffuser plate for the purpose of reducing luminance unevenness generated by diffraction spots caused by periodicity of microstructures. In this single diffuser plate, at least one parameter defining shapes or locations of the microstructures is randomly distributed in accordance with a predetermined probability density function.

CITATION LIST

Patent Literature

Patent Literature 1: Published Japanese Translation of PCT International Publication for Patent Application, No. 2004-505306
Patent Literature 2: Japanese Unexamined Patent Application Publication No. 2010-250037
Patent Literature 3: International Patent Publication No. WO2012/117495
Patent Literature 4: Japanese Unexamined Patent Application Publication No. 2012-226300
Patent Literature 5: Published Japanese Translation of PCT International Publication for Patent Application, No. 2007-523369

Non Patent Literature

Non Patent Literature 1: H. Urey and K. D. Powell, "Microlens-array-based exit-pupil expander for full-color displays", APPLIED OPTICS Vol. 44, No. 23, p. 4930-4936

SUMMARY OF INVENTION

Technical Problem

Patent Literature 1 shows an angle property of diffused light in the single diffuser having, for example, a lens diameter of 100 μm, a maximum sag of 10 μm, and a raised height of ±2 μm. In the vicinity of the angle of 40°, namely, in the vicinity of both ends of a central part that rises upward from both end parts of a top hat-shaped intensity distribution curve, the intensity of luminance is rapidly fluctuated. Thus, the luminance is locally uneven.

The present disclosure has been made in view of the above circumstances. An object of the present disclosure is to provide a composite diffuser plate capable of inhibiting local luminance unevenness.

Solution to Problem

A composite diffuser plate according to the present disclosure includes a first diffuser plate (e.g., a random micro array) and a second diffuser plate (e.g., a mat plate, a uniform micro array) arranged in this order from an incident side.

At least one of the first diffuser plate and the second diffuser plate is composed of a random microlens array including a plurality of microlenses.

The plurality of microlenses include a plurality of parameters defining a lens shape.

At least one of the plurality of parameters is randomly distributed.

The random microlens array causes a phase difference to be generated in transmitted light.

With such a configuration, it is possible to inhibit luminance unevenness from occurring locally.

It may be characterized in that: the first diffuser plate is composed of the random microlens array; diffused light intensity of the first diffuser plate is distributed along a top hat-shaped curve; and a diffusion angle of the first diffuser plate is greater than or equal to a diffusion angle of the second diffuser plate.

It may be further characterized in that, in a distribution curve of the diffused light intensity, in a case where a top width is a width between a first inflection point and a second inflection point, the first inflection point being at a largest viewing angle from a viewing angle of 0° to a positive maximum value of an absolute value of the viewing angle, and the second inflection point being at a smallest viewing angle from a negative maximum value of the absolute value of the viewing angle to the viewing angle of 0°, a top width of the composite diffuser plate is less than or equal to 1.200 times the top width of the distribution curve of the first diffuser plate.

With such a configuration, it is possible to inhibit luminance unevenness from occurring locally and to inhibit spreading of diffused light. Therefore, a diffused light intensity distribution of the composite diffuser plate can maintain its top hat-shaped curve in a favorable manner.

It may be further characterized in that the second diffuser plate is composed of a mat plate including a micro contoured pattern on its main surface.

With such a configuration, it is possible to more reliably inhibit luminance unevenness from occurring locally at a low cost.

It may be further characterized in that the second diffuser plate is composed of a uniform microlens array. The uniform microlens array is formed by arranging a plurality of microlenses having substantially the same shape at substantially the same intervals.

With such a configuration, it is possible to more reliably inhibit luminance unevenness from occurring locally.

It may be further characterized in that: the random microlens array includes a plate and the plurality of microlenses disposed on a main surface of the plate; the microlens includes a lens part and a raised part that raises the lens part from the plate; each of a plurality of the lens parts of the respective plurality of microlenses has substantially the same length in a convex direction; heights of raise of a plurality of the raised parts of the respective plurality of microlenses are distributed within a predetermined range; the microlens has a convex part maximum height, the convex part maximum height being a sum of a height of the lens part and a height of the raised part; and a maximum height difference ΔH [μm] of the convex part maximum height of the plurality of microlenses, a refractive index n of a material forming the microlenses, and a wavelength λ [nm] of a light source satisfy $0.2 \leq 1000 \times \Delta H \times (n-1)/\lambda$.

With such a configuration, by giving a phase difference between the plurality of microlenses, it is possible to inhibit luminance unevenness caused by diffraction from occurring.

It may be further characterized in that: the second diffuser plate further includes a reflection part (e.g., reflection plate); and the reflection part is installed on a main surface opposite to the incident side of the second diffuser plate.

With such a configuration, it is possible to inhibit local uneven luminance from occurring locally and to reflect light.

Advantageous Effects of Invention

According to the present disclosure, it is possible to provide a composite diffuser plate that can inhibit luminance unevenness from occurring locally.

DESCRIPTION OF EMBODIMENTS

First Embodiment

Figure 1:
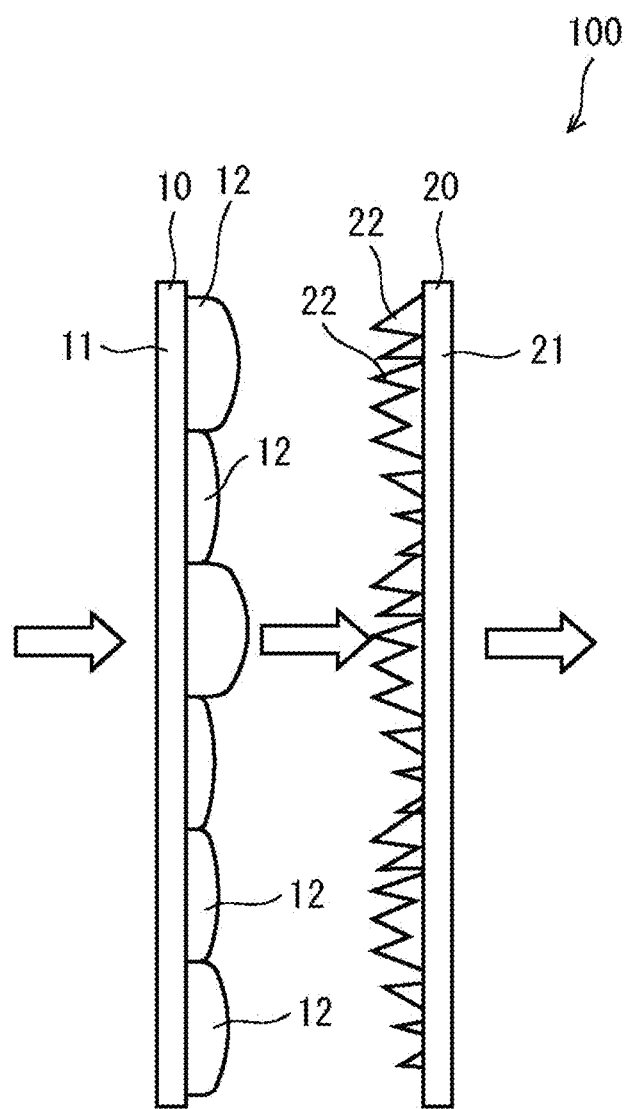
FIG. 1 is a side view of a composite diffuser plate according to a first embodiment.
Figure 2:
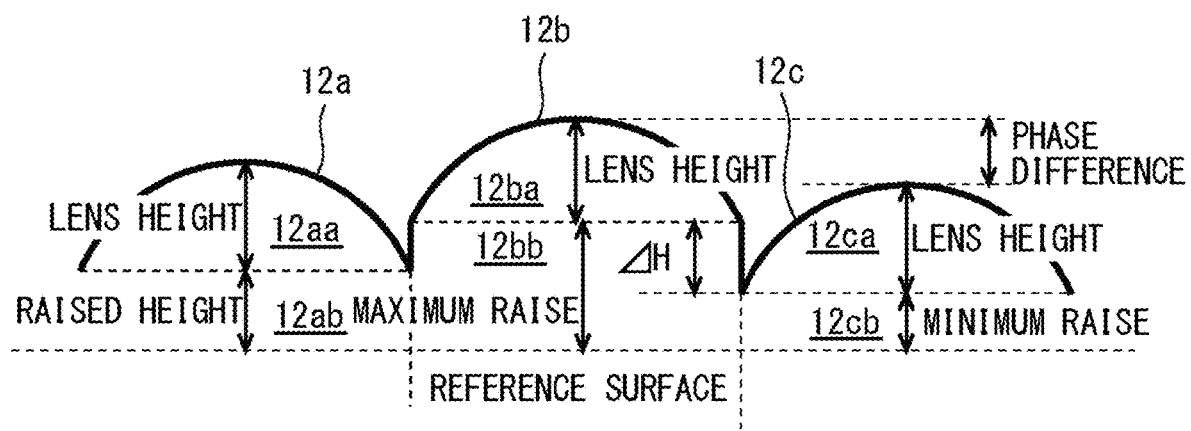
FIG. 2 is a schematic diagram of a main part of the composite diffuser plate according to the first embodiment.

A composite diffuser plate according to a first embodiment will be described with reference to FIGS. 1 and 2. FIG. 1 is a side view of the composite diffuser plate according to the first embodiment. FIG. 2 is a schematic diagram of a main part of the composite diffuser plate according to the first embodiment.

As shown in FIG. 1, a composite diffuser plate 100 includes a random microlens array 10 and a mat plate 20. Both the random microlens array 10 and the mat plate 20 are diffuser plates that allow incident light to pass therethrough and that diffuse the transmitted light outward. The composite diffuser plate 100 can be used as a transmissive screen. Further, the random microlens array 10 and the mat plate 20 are arranged in this order from an incident side to an emission side with a predetermined distance therebetween. The distance between the random microlens array 10 and the mat plate 20 may be shorter or longer than a focal length of the microlens 12. A maximum distance between the random microlens array 10 and the mat plate 20 is preferably a distance that allows all the light passing through the random microlens array 10 to be incident on the mat plate 20. This is to maintain utilization of the light and to inhibit the property from being deteriorated due to stray light. The composite diffuser plate 100 may be formed by arranging two plates of the random microlens array 10 and the mat plate 20 side by side. Alternatively, the composite diffuser plate 100 may be formed as a unitary molded article.

The random microlens array 10 includes a plate 11 and a plurality of microlenses 12. The plurality of microlenses 12 are provided on a main surface on the emission side of the plate 11. The plurality of microlenses 12 have a phase difference from one another. This phase difference is expressed by standardizing a difference in optical path lengths of the light transmitted through or reflected by the microlens 12 with a wavelength. This phase difference can be changed by randomly distributing at least one of parameters defining the lenses. Examples of such parameters include a lens height, a lens diameter, a lens curvature, a lens pitch, a lens arrangement, a lens refractive index, and the like.

For example, in a case where the plurality of microlenses 12 have substantially the same cross-sectional profile and have different heights of raise, there may be the phase difference between the plurality of microlenses 12. In such a case, the random microlens array 10 may be referred to as a raised height random microlens array.

In a case where the random microlens array 10 is the raised height random microlens array, as shown in FIG. 2, there are microlenses 12a, 12b, and 12c as specific examples of the microlenses 12. The microlens 12a includes a lens part 12aa and a raised part 12ab. The raised part 12ab raises the lens part 12aa from a reference surface. Note that this reference surface is the main surface on the emission side of the plate 11. A convex part maximum height of the microlens 12a is a sum of the lens height, which is a height of the lens part 12aa, and a height of the raise, which is a height of the raised part 12ab. The heights of the raise of the respective microlenses 12 have a distribution within a certain range.

The convex part maximum heights of the respective microlenses 12 are distributed within a certain range to thereby generate the phase difference. This phase difference contributes to reduce luminance and color unevenness that occurs due to diffraction. Specifically, the distribution of the heights of the raise of the microlenses 12 may be determined as follows. A maximum height difference ΔH of the convex part maximum heights of the respective microlenses is set. Then, the heights of the raised parts may be arbitrarily distributed within the range of the maximum height difference ΔH such as in a uniformly random distribution, a pseudo random distribution, or the like.

For example, assume that a microlens 12b has the greatest convex part maximum height within the certain range and the microlens 12c has the smallest convex part maximum height within the certain range. In this case, a lens part 12ba of the microlens 12b and a lens part 12ca of the microlens 12c have substantially the same cross-sectional profile. Thus, the lens parts 12ba and 12ca have the same length in convex directions of the lens parts. Further, a difference in the heights of a raised part 12bb and a raised part 12cb is the maximum height difference ΔH.

A phase difference ΔP corresponding to the maximum height difference ΔH [μm] of the convex part maximum heights of the respective microlenses is expressed by the following Equation 1.

$$\Delta P = 1000 \times \Delta H \times (n-1)/\lambda \quad \text{(Equation 1)}$$

n: a refractive index of the material forming the microlenses 12
λ [nm]: a wavelength of a light source The phase difference ΔP is preferably 0.2 or greater, and is more preferably 0.5 or greater in terms of reducing luminance and color unevenness.

Referring again to FIG. 1, the mat plate 20 includes a plate body 21 and a micro contoured pattern 22. The micro contoured pattern 22 is provided on a main surface on the incident side of the plate body 21. The incident side main surface of the plate body 21 provided with the micro contoured pattern 22 functions as a mat surface of the mat plate 20.

Incidentally, each of the diffuser plates has a unique top width (described later) defined in a distribution curve of diffused light intensity. The diffused light intensity is, for example, intensity with respect to a viewing angle of a transmission image of the light transmitted through the diffuser plate. It is preferable that the top width of the mat plate 20 be selected so that the top width of the composite diffuser plate 100 will become within 1.200 times the top width of the random microlens array 10. In other words, in a case where the composite diffuser plate 100 is formed by arranging the mat plate 20 on the emission side of the random microlens array 10, the top width of the composite diffuser plate 100 is preferably within 1.200 times the top width of the random microlens array 10.

(Definition of Top Width)

Figure 3:
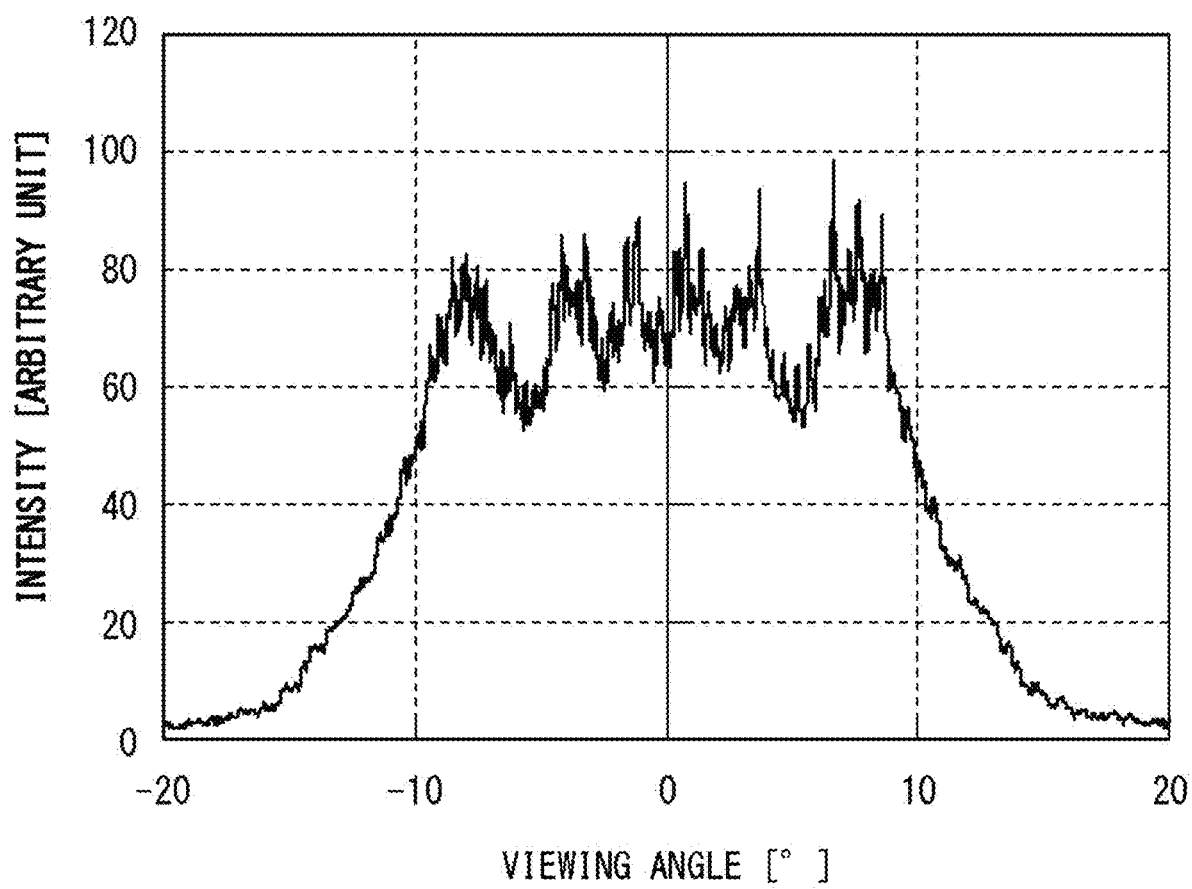
FIG. 3 is a graph showing an example of an intensity distribution with respect to a viewing angle.
Figure 4:
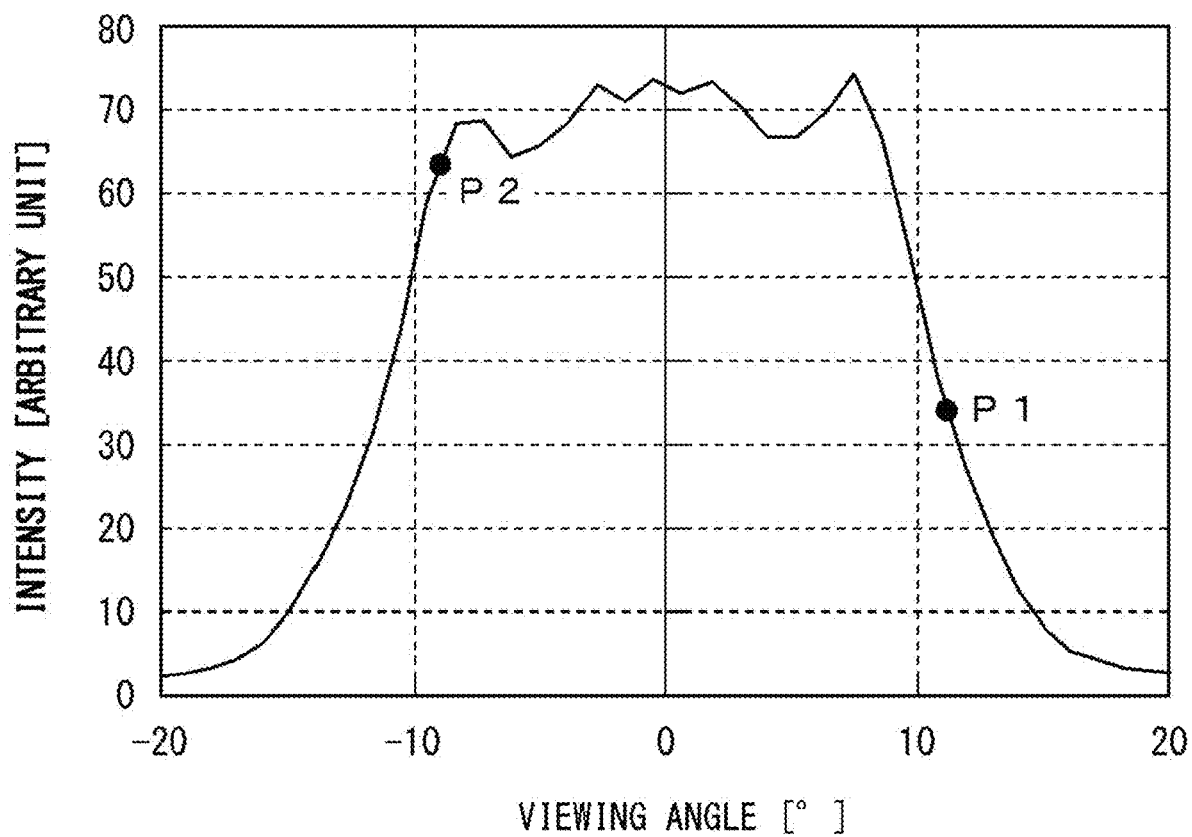
FIG. 4 is a graph showing a distribution obtained by performing moving average processing on the example of the intensity distribution with respect to the viewing angle.
Figure 5:
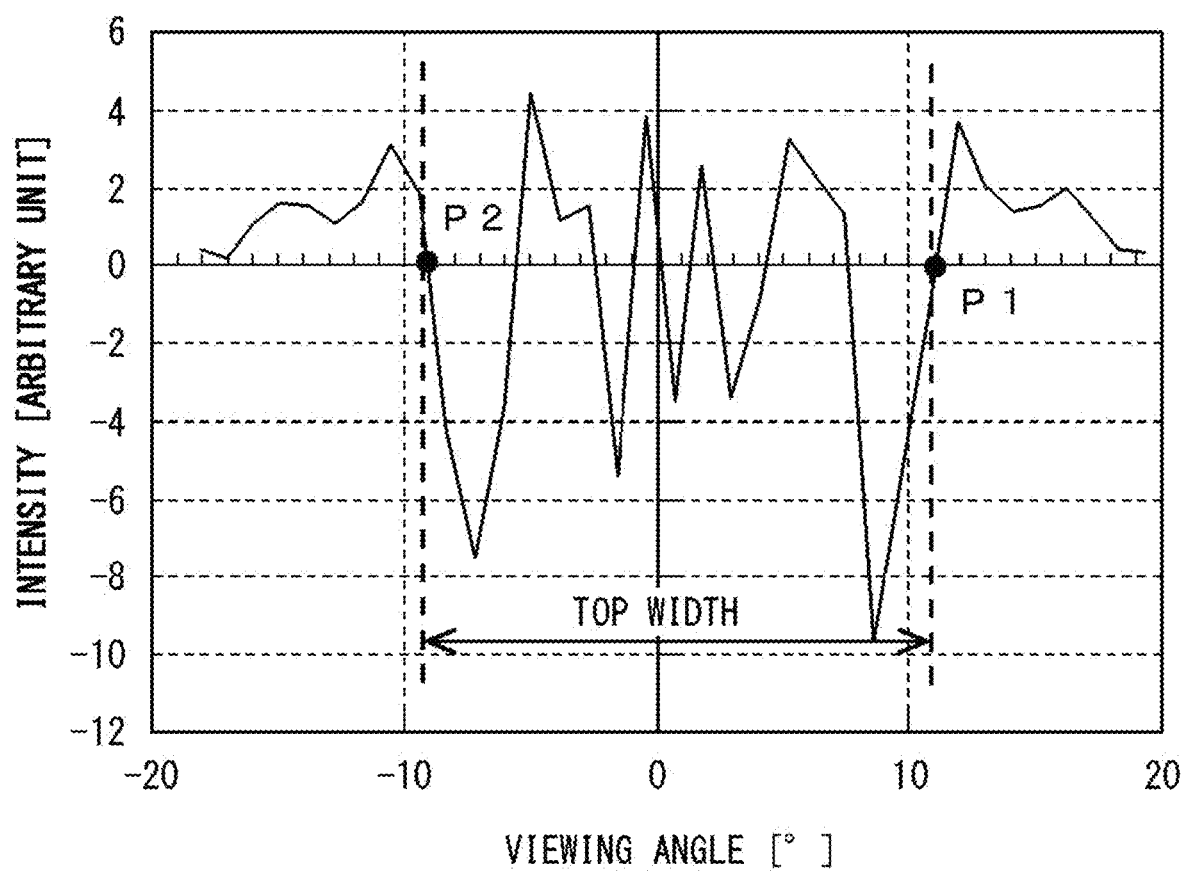
FIG. 5 is a graph showing a distribution obtained by taking second derivatives of the intensity distribution with respect to the viewing angle, which has been subjected to the moving averaging processing.

Next, a method for measuring the top width in the present specification will be described with reference to FIGS. 3 to 5. FIG. 3 is a graph showing an example of an intensity distribution with respect to the viewing angle. FIG. 4 is a graph showing a distribution obtained by performing moving average processing on the example of the intensity distribution with respect to the viewing angle. FIG. 5 is a graph showing a distribution obtained by taking second derivatives of the intensity distribution with respect to the viewing angle, which has been subjected to the moving averaging processing.

Firstly, the diffuser plate is irradiated with a He—Ne laser beam. Next, a transmission image of the He—Ne laser beam is projected onto a frosted glass. This transmission image is photographed by a CCD (Charge-Coupled Device) camera. Then, luminance information is generated from the transmission image. As shown in FIG. 3, the intensity distribution with respect to the viewing angle is obtained from the generated luminance information. As shown in FIG. 4, moving averaging processing is performed on the obtained intensity distribution with respect to the viewing angle. Then, the distribution curve of the intensity is smoothed. As shown in FIG. 5, second derivatives processing is performed on the smoothed distribution curve. The inflection points in the distribution curve that has been subjected to the second derivatives processing are obtained. The top width corresponds to a width of the top hat-shaped part in the distribution curve of the intensity with respect to the viewing angle shown in FIG. 4. Further, the top width is a width between angles of the first inflection points toward 0° from maximum values of absolute values of the viewing angle. The top hat-shaped part includes, for example, one end part, an ascending part, a central part, a descending part, and another end part. The one end part, the ascending part, the central part, a descending part, and the other end part are contiguous with one another in order toward a direction in which the viewing angle increases. The central part is higher than the one end part and the other end part. The ascending part is inclined so as to rise toward the direction in which the viewing angle increases. The descending part is inclined so as to fall toward the direction in which the viewing angle increases. The ascending and descending parts each have the inflection point. The top width may be a width between these inflection points.

Specifically, in FIG. 5, the top width corresponds to a width between a first inflection point P1 and a second inflection point P2. The first inflection point P1 in this example is at an angle of a first inflection point toward 0° from about 20°, which is a positive maximum value of the absolute value of the viewing angle. That is, the first inflection point P1 is at about 11°. Moreover, the second inflection point P2 is at an angle of a first inflection point toward 0° from about −20°, which is a negative maximum value of the absolute value of the viewing angle. That is, the second inflection point P2 is at about −9°. Accordingly, in the example shown in FIG. 5, the top width is a width between about −9° and about 11°, i.e., about 20°.

(Top Width Measurement Experiment)

Figure 6:
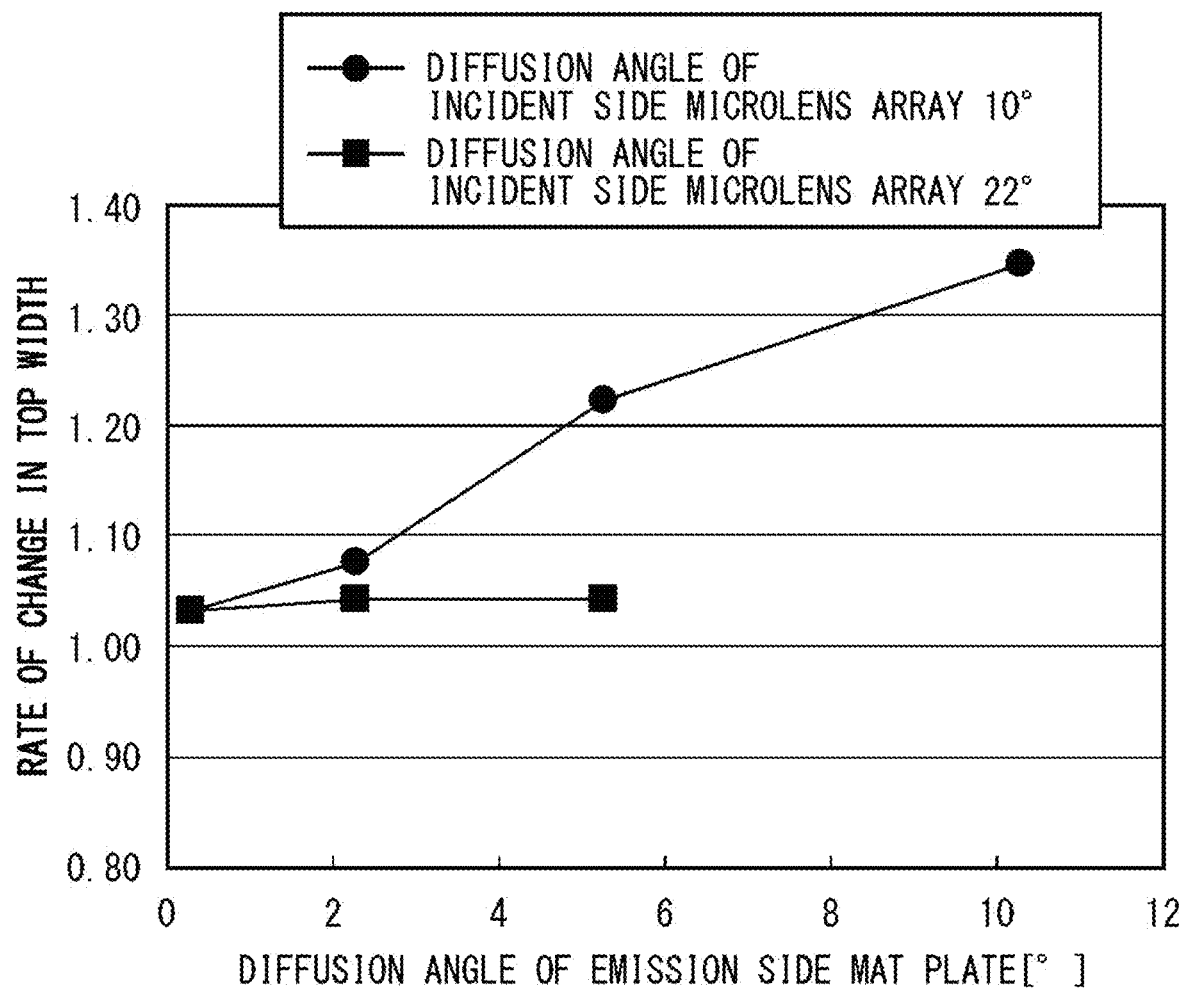
FIG. 6 is a graph showing a rate of change in a top width with respect to the viewing angle of an emission side mat plate.
Figure 7:
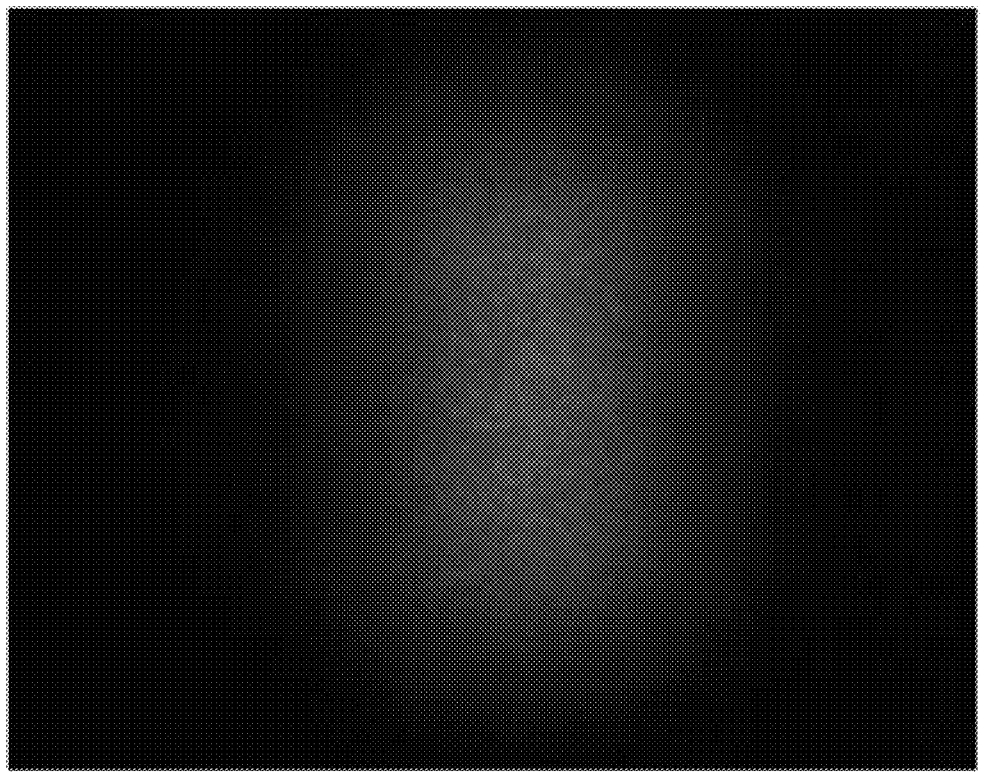
FIG. 7 is a photograph showing an example of a transmission image of the composite diffuser plate according to the first embodiment.
Figure 8:
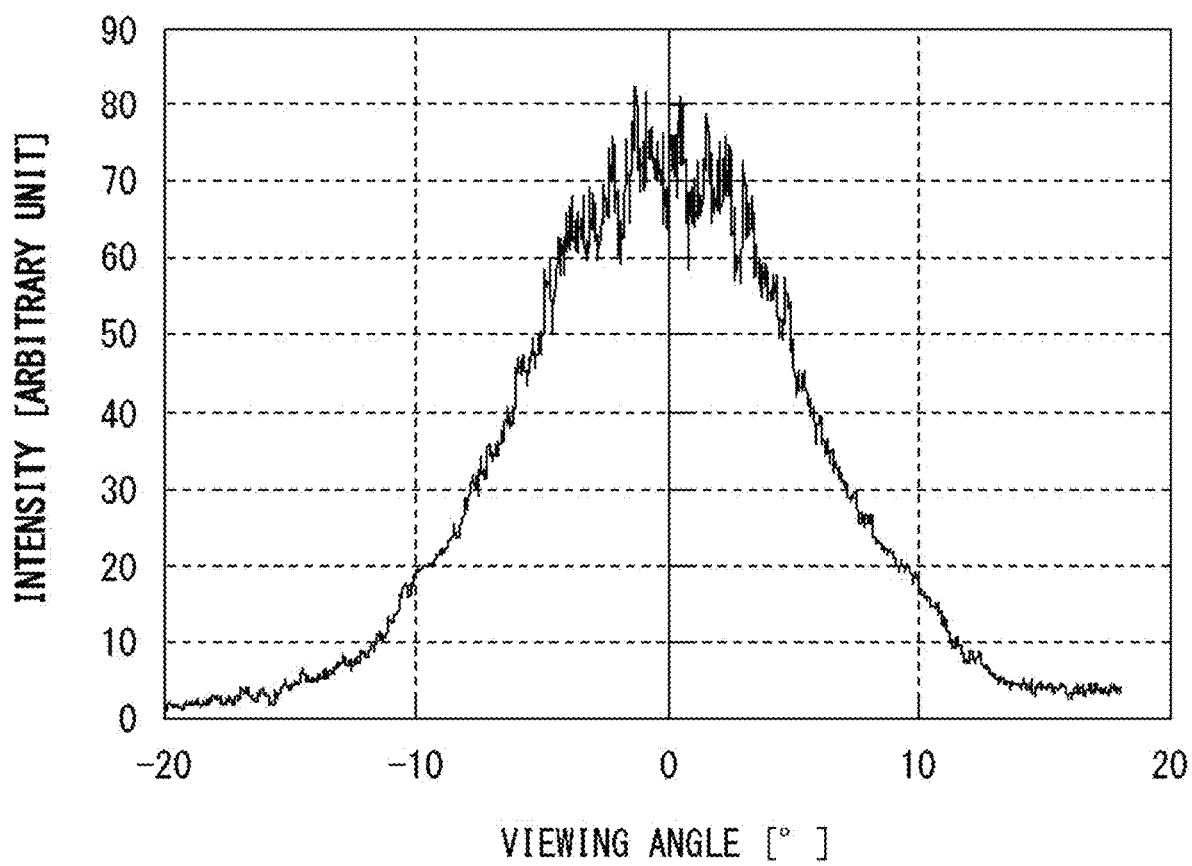
FIG. 8 is a graph showing an intensity with respect to the viewing angle of the example of the transmission image of the composite diffuser plate according to the first embodiment.
Figure 9:
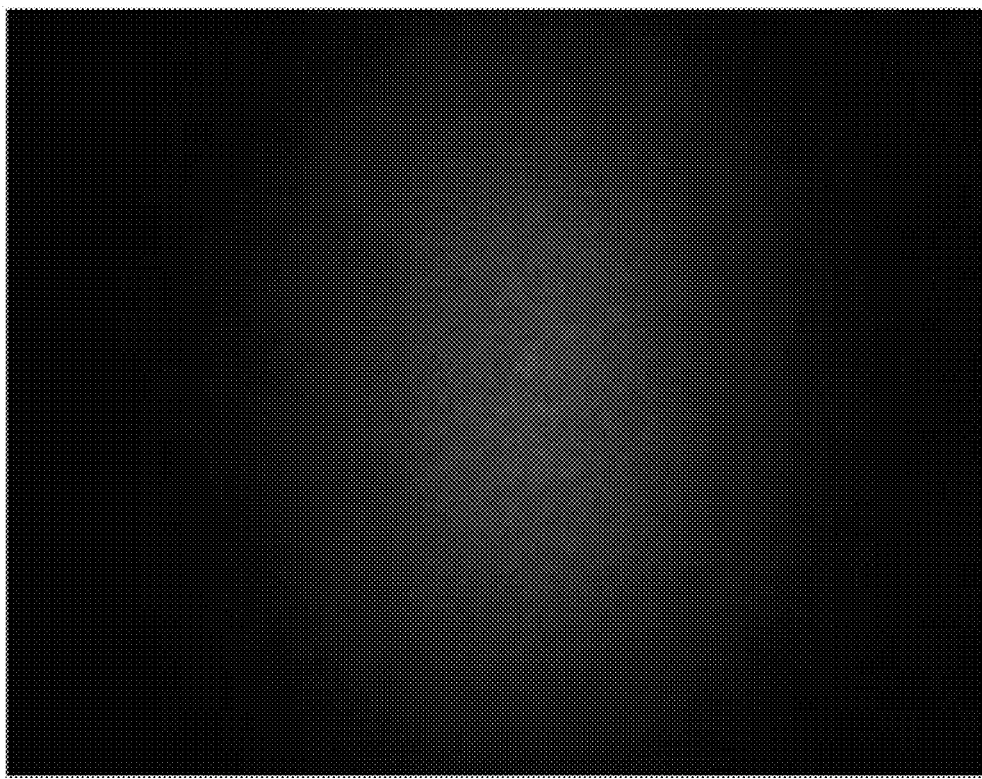
FIG. 9 is a photograph showing an example of a transmission image of the composite diffuser plate according to the first embodiment.
Figure 10:
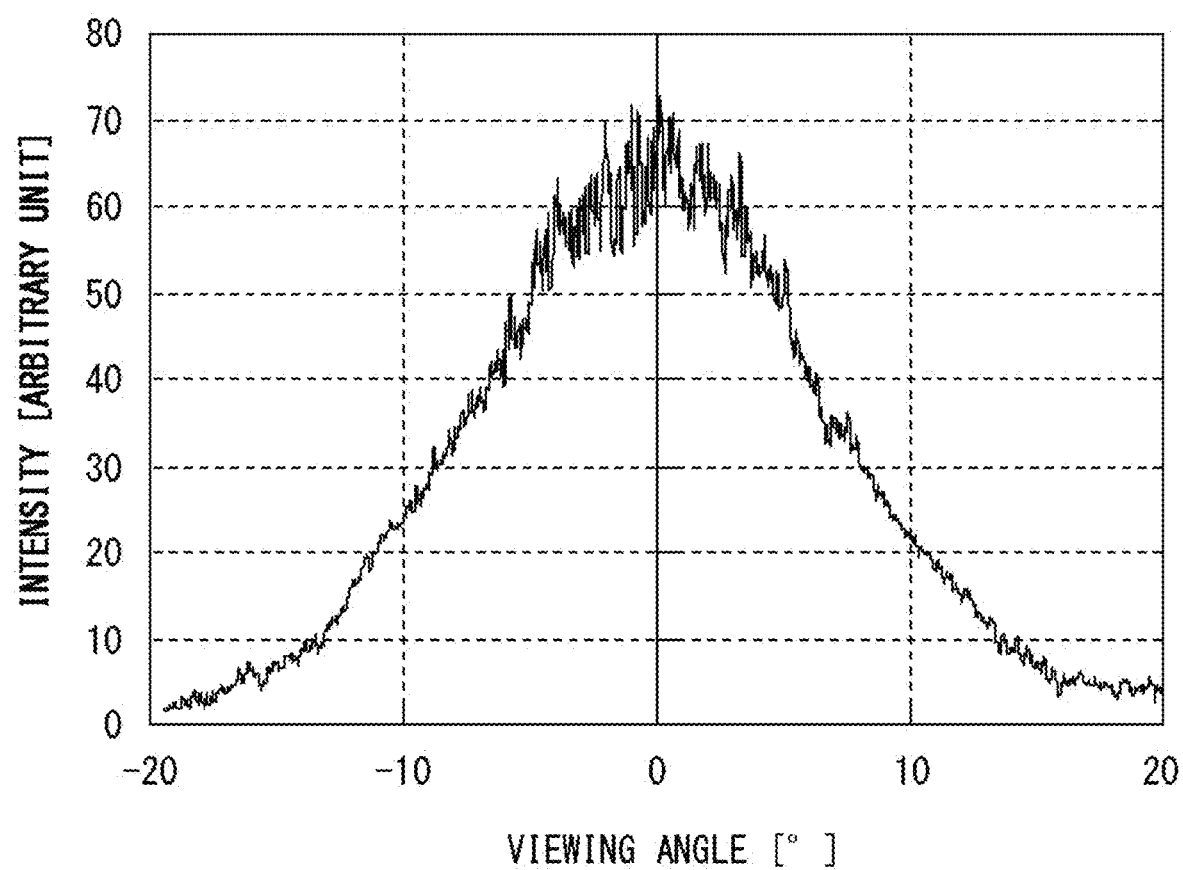
FIG. 10 is a graph showing an intensity with respect to the viewing angle of the example of the transmission image of the composite diffuser plate according to the first embodiment.
Figure 17:
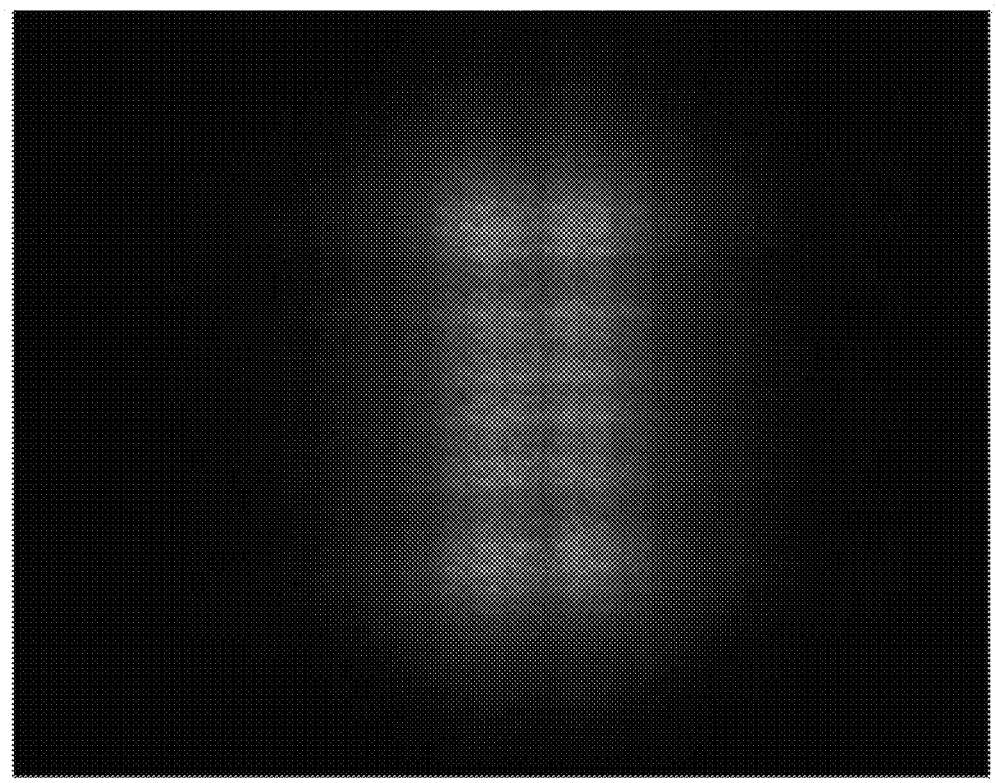
FIG. 17 is a photograph showing an example of a transmission image of a single diffuser plate.
Figure 18:
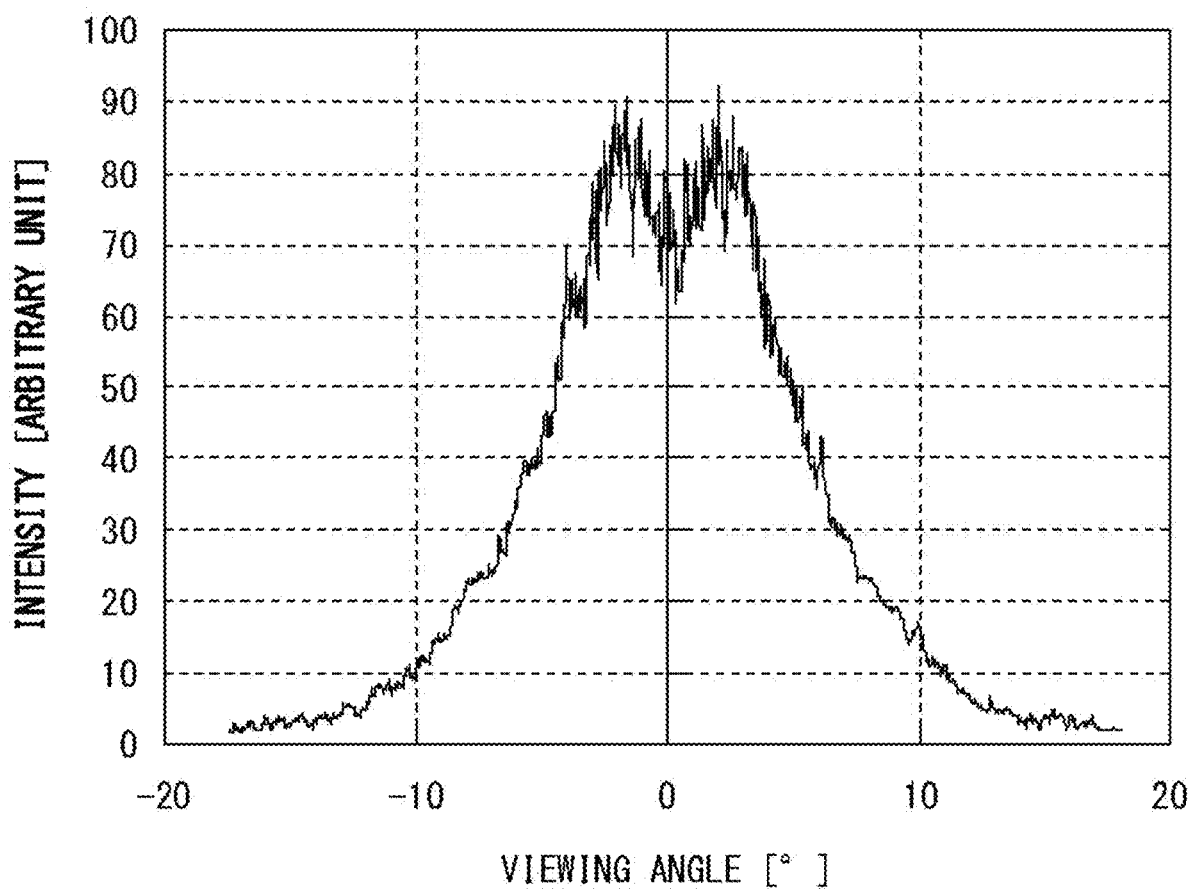
FIG. 18 is a graph showing an intensity with respect to a viewing angle of the example of the transmission image of the single diffuser plate.

Next, with reference to FIGS. 6 to 10, 17, and 18, an experiment will be described, in which top widths of a composite diffuser plate and a single diffuser plate were measured using the above-described method for measuring the top width. FIG. 6 is a graph showing a rate of change in the top width with respect to the viewing angle of the emission side mat plate. FIGS. 7 and 9 are photographs showing examples of a transmission image of the composite diffuser plate according to the first embodiment. FIGS. 8 and 10 are graphs showing intensity with respect to the viewing angle of the example of the transmission image of the composite diffuser plate according to the first embodiment. FIG. 17 is a photograph showing an example of a transmission image of a single diffuser plate. FIG. 18 is a graph showing intensity with respect to the viewing angle of the example of the transmission image of the single diffuser plate.

The top widths of the composite diffuser plate and the single diffuser plate having the conditions shown in the following Table 1 were measured. Examples 1 to 8 are related to a composite diffuser plate having the same configuration as that of the composite diffuser plate 100 (see FIG. 1). Comparative Examples 1 and 2 are related to a single diffuser plate composed of one microlens array having the same configuration as that of the random microlens array 10 (see FIG. 1).

TABLE 1

| | Incident side microlens array diffusion angle [°] | Emission side mat plate diffusion angle [°] |
|---|---|---|
| Example 1 | 10 | 0 |
| Example 2 | 10 | 2 |
| Example 3 | 10 | 5 |
| Example 4 | 10 | 10 |
| Example 5 | 22 | 0 |
| Example 6 | 22 | 2 |
| Example 7 | 22 | 5 |
| Example 8 | 22 | 10 |
| Comparative Example 1 | 10 | — |
| Comparative Example 2 | 22 | — |

The rate of change in the top width of the composite diffuser plate with respect to the single diffuser plate having a fixed diffusion angle of the incident side microlens array was calculated. FIG. 6 shows a result of the calculated changes of rate. The diffusion angle of the diffuser plate is a full width display of a half maximum of central illuminance of the diffused light which was incident on and diffused by the diffuser plate. More specifically, in the case where the diffusion angle of the incident side microlens array was 10°, i.e., the rates of change in the top width of Examples 1 to 4 were, values obtained by dividing the top widths of respective Examples 1 to 4 by the top width of Comparative Example 1. In the case where the diffusion angle of the incident side microlens array was 22°, i.e., the rates of change in the top width of Examples 5 to 8 were, values obtained by dividing the top widths of respective Examples 5 to 8 by the top width of Comparative Example 2. FIGS. 7 and 8 show a transmission image of Example 3 and the intensity with respect to the viewing angle thereof, respectively. FIGS. 9 and 10 show a transmission image of Example 4 and the intensity with respect to the viewing angle thereof, respectively. FIGS. 17 and 18 show a transmission image of Comparative Example 1 and the intensity with respect to the viewing angle thereof, respectively.

As shown in FIG. 6, at the diffusion angle of the incident side microlens array of 10°, in the case where the diffusion angle of the emission side mat plate was increased, the top width became greater.

For example, in the case where the diffusion angle of the mat plate was 5°, i.e., in Example 3, the rate of change in the top width was slightly less than 1.200. As shown in FIGS. 7 and 8, the transmission image of Example 3 was slightly larger and had smaller luminance unevenness than the transmission image of Comparative Example 1 (see FIGS. 17 and 18). That is, the degree of spreading of the transmission image was not very large. In addition, it was confirmed that luminance unevenness was inhibited. To be more specific, no intensity fluctuation was observed at the center of the top hat-shaped distribution curve.

In the case where the diffusion angle of the emission side mat plate was 10°, i.e., in Example 4, the rate of change in the top width exceeded 1.30. As shown in FIGS. 9 and 10, the transmission image of Example 1 was larger and had smaller luminance unevenness than the transmission image of Comparative Example 1 (see FIGS. 17 and 18). That is, the degree of spreading of the transmission image was large. In addition, it was confirmed that luminance unevenness was made smaller. To be more specific, no intensity fluctuation was observed at the center of the top hat-shaped distribution curve.

On the other hand, at the diffusion angle of the incident side microlens array of 22°, in the case where the diffusion angle of the emission side mat plate was increased, the luminance unevenness was made smaller while the rate of change in the top width did not change much, at about 1.00 to about 1.02. However, in the case where the diffusion angle of the mat plate was 10°, i.e., in Example 8, the top hat property disappeared. Thus, the top width could not be measured. Therefore, the rate of change in the top width could not be calculated.

From the abovementioned calculation results of the rates of change in the top width and the results of visual observations on the transmission images, in the case where the diffusion angle of the mat plate was 5° or less, the transmission image did not spread much. In a case where it is required to inhibit the spreading of the transmission image, it is preferable to select the diffusion angle of the mat plate on the emission side so that the rate of change in the top width becomes 1.200 or less. On the other hand, in all of Examples 1 to 8, it was confirmed that the rates of change in the top width were 1.006 or greater, and local luminance unevenness was made smaller. Therefore, in a case where the diffusion angle of the emission side mat plate is selected so that the rate of change in the top width becomes 1.006 or greater, local luminance unevenness can be more reliably inhibited.

As described above, according to the composite diffuser plate of the first embodiment, by arranging the random microarray and the mat plate, it is possible to inhibit intensity fluctuations in the center of the top hat shape and to thereby inhibit local luminance unevenness.

Moreover, according to the composite diffuser plate of the first embodiment, it is possible to inhibit the rate of change in the top width and to thereby inhibit the spreading of the diffused light. Therefore, the intensity distribution curve of the diffused light can maintain the top hat shape in a favorable manner. A diffuser plate that diffuses light so as to have a top hat-shaped intensity distribution curve is preferably applied to applications that are required to illuminate only a limited area. The applications are, for example, an application where the driver's field of view needs to be illuminated such as a head-up display. It is particularly preferable to apply the composite diffuser plate according to the first embodiment to such an application. This is because the composite diffuser plate according to the first embodiment diffuses light so as to have a top hat-shaped intensity distribution curve and corrects luminance unevenness.

Incidentally, there is a composite diffuser plate including a uniform microlens array and a mat plate 20. In the uniform microlens array, lens heights and the heights of raise are uniform. In such a composite diffuser plate, even if the uniform microlens array is optically designed to have desired diffusion properties, luminance unevenness strongly occurs due to diffraction and interference in the microlenses included in the uniform microlens array. This luminance unevenness cannot be sufficiently corrected by the mat plate 20 alone. In order to correct this luminance unevenness, a method for increasing the diffusion angle of the mat surface of the mat plate 20 may be employed. However, in a case where this method is employed, diffusion properties as a composite diffuser plate change. Thus, the desired diffusion properties cannot be achieved. As compared to such a composite diffuser plate, the diffuser plate 100 can achieve the desired diffusion properties while inhibiting luminance unevenness that occurs due to diffraction and interference. The composite diffuser plate 100 can further correct the remaining luminance unevenness by using the mat plate 20.

(Method for Manufacturing Raised Height Random Microlens Array)

Next, a method for manufacturing the raised height random microlens array will be described.

Prior to the manufacturing of the raised height random microlens array, designing thereof is carried out. First, a lens shape to be a reference is designed according to optical properties of a material forming the composite diffuser plate and a desired diffusion angle distribution. A shape of the main surface of the microlens may be spherical or aspherical. The optical design can be carried out using a ray tracing method or the like. It is preferable that microlenses each having a regular hexagonal bottom surface be arranged in a triangular lattice pattern on a plate. This is because the microlenses can be closest packed on the plate in this way. In order to give anisotropy to the diffusion angle properties, an aspect ratio of the microlenses may be arbitrarily set. Examples of the bottom surface shape of the microlens include, besides a hexagon, a quadrangle and the like. In a case where the bottom surface shape of the microlens is a quadrangle, the microlenses may be arranged in a square lattice pattern on the plate.

In addition, the phase difference ΔP between the microlenses is set. More specifically, the phase difference ΔP can be obtained by using the above-described Equation 1. In Equation 1, the refractive index n of the material forming the microlens 12, the wavelength λ of the light source, and the maximum height difference ΔH of the convex part maximum height of the microlens 12 are used. In this manner, exposure data of the microlens array in which a plurality of microlenses are arranged in a desired area is generated. Such a plurality of microlenses have substantially the same lens curvature but different heights of the raise from one another.

Firstly, a photoresist is applied to a substrate. The applied photoresist is irradiated with a laser beam that is being scanned. Then, the irradiated photoresist is exposed based on the exposure data (exposure step S1). A wavelength of the laser beam to be used here is not particularly limited and is selected according to the type of the photoresist used. The wavelength of the laser beam may be, for example, 351 nm, 364 nm, 458 nm, 488 nm (oscillation wavelengths of an Ar$^l$ laser), 351 nm, 406 nm, 413 nm (oscillation wavelengths of a Kr$^l$ laser), 352 nm, 442 nm (oscillation wavelengths of an He—Cd laser), 355 nm, 473 nm (pulse oscillation wavelengths of a diode-pumped solid-state laser), 375 nm, 405 nm, 445 nm, 488 nm (a semiconductor laser), or the like.

Next, the exposed photoresist is developed to form a photoresist master (developing step S2). An example of the developing method includes a method in which the exposed photoresist is immersed in an alkaline developer. Examples of the alkaline developer include tetramethylammonium hydroxide (TMAH) and the like. In the developing step, a part of the photoresist is removed from the substrate according to an amount of the exposure. The photoresist remaining on the substrate has a contoured shape based on the designed microlens array.

Further, by electroforming, a plate-shaped stamper made of nickel is formed on the surface of the photoresist of the photoresist master (electroforming step S3). The contoured shape of the photoresist is transferred to the surface of the stamper. The stamper is released from the photoresist master to be used.

Lastly, while the acrylic sheet is heated, hot press molding is performed by pressing with the stamper (molding step S4). In the molding step S4, as the molding method, injection molding, imprint molding using an ultraviolet curable resin, or the like can be used instead of the hot press molding.

By going through the above exposure step S1 to molding step S4, it is possible to manufacture the raised height random microlens array.

Second Embodiment

Figure 11:
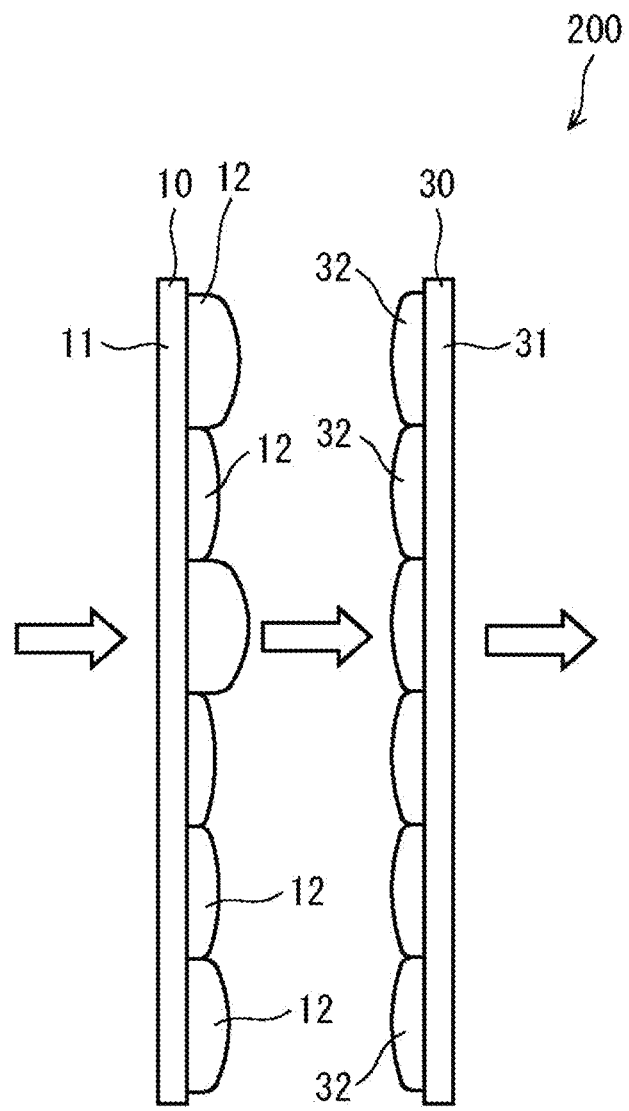
FIG. 11 is a side view of a composite diffuser plate according to a second embodiment.

Next, a composite diffuser plate according to a second embodiment will be described with reference to FIG. 11. FIG. 11 is a side view of the composite diffuser plate according to the second embodiment. The composite diffuser plate according to the second embodiment has the same configuration as that of the composite diffuser plate according to the first embodiment except for the following point. In the composite diffuser plate according to the second embodiment, a uniform micro random array is used in place of the mat plate 20 of the composite diffuser plate according to the first embodiment. While the different configuration will be described below, the same configuration will not be described.

As shown in FIG. 11, the composite diffuser plate 200 includes a uniform microlens array 30 disposed on the emission side of the random microlens array 10. The uniform microlens array 30 includes a plurality of microlenses 32. The plurality of microlenses 32 are provided on a main surface on an incident side of a plate 31. The plurality of microlenses 32 are optically designed so that there is almost no phase difference, that is, substantially zero phase difference, therebetween.

In a case where incident light is made incident on the random microlens array 10 of the composite diffuser plate 200, the incident light passes through the random microlens array 10 and the uniform microlens array 30 in this order. The composite diffuser plate 200 can be used as a transmissive screen. The diffusing effect of the random microlens array 10 and the diffusing effect of the uniform microlens array 30 overlap, so that luminance unevenness caused by diffraction and interference can be inhibited.

According to the composite diffuser plate of the second embodiment, it is possible to more reliably inhibit luminance unevenness from occurring locally. Additionally, there is no need to position the diffuser plates with high accuracy.

Third Embodiment

Figure 12:
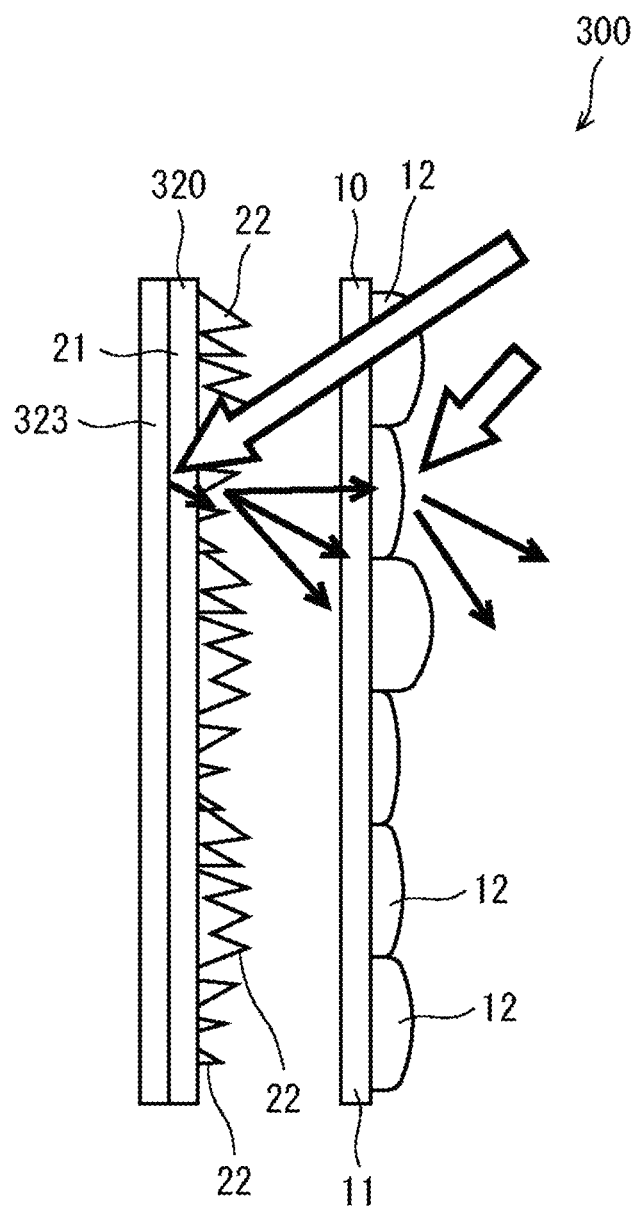
FIG. 12 is a side view of the composite diffuser plate according to the third embodiment.

Next, a composite diffuser plate according to a third embodiment will be described with reference to FIG. 12. FIG. 12 is a side view of the composite diffuser plate according to the third embodiment. The composite diffuser plate according to the third embodiment has the same configuration as that of the composite diffuser plate according to the first embodiment except for the following point. The composite diffuser plate according to the third embodiment includes a reflection plate and has a different orientation of the microlens array from that of the microlens array of the first embodiment.

As shown in FIG. 12, a composite diffuser plate 300 includes a random microlens array 10 and a reflection plate 320. The random microlens array 10 and the reflection plate 320 are arranged in this order from an incident side. The composite diffuser plate 300 can be used as a reflective screen.

The random microlens array 10 includes a plate 11 and microlenses 12 arranged on a main surface of the plate 11. The random microlens array 10 is installed so that the microlenses 12 face the incident side.

The reflection plate 320 includes a plate body 21, a micro contoured pattern 22, and a mirror 323. The micro contoured pattern 22 is disposed on the main surface of the plate body 21. The mirror 323 is disposed on a main surface opposite to the main surface on which the micro contoured pattern 22 is disposed. The reflection plate 320 is installed so that the micro contoured pattern 22 faces the incident side.

In a case where the random microlens array 10 of the composite diffuser plate 300 is irradiated with light, the light passes through the random microlens array 10, the micro contoured pattern 22, and the plate body 21. Then, the light is reflected by the mirror 323. Next, the reflected light passes through the plate body 21, the micro contoured pattern 22, and the random microlens array 10 and travels toward the incident side. The luminance unevenness that remains in the random microlens array 10 without being completely eliminated is reflected by the mirror 323 and is further diffused and reduced.

As described above, according to the third embodiment, it is possible to inhibit the local luminance unevenness and to reflect the diffused light.

(Laser Irradiation Experiment)

Next, with reference to FIGS. 13 to 16 and FIGS. 19 to 22, an experiment will be described, in which the composite diffuser plate and the single diffuser plate were irradiated with a laser.

Example 2-1 is related to a composite diffuser plate having the same configuration as that of the composite diffuser plate 100 (see FIG. 1). Example 2-2 is related to a composite diffuser plate having the same configuration as that of the composite diffuser plate 200 (see FIG. 11). A random microlens array including microlenses each having a rectangular bottom surface was used as a random microlens array of each of Examples 2-1 and 2-2. In this random microlens array, a plurality of microlenses were arranged at a pitch Px of 20 μm in an X direction and a pitch Py of 37 μm in a Y direction. A lens radius of curvature was 58.5 μm.

The refractive index n of a material forming the microlenses 12 was set to 1.5, the wavelength λ was set to 750 μm, and the phase difference ΔP was set to 1 wavelength. Then, by using the above-described Equation 1, the maximum height difference (raised height) ΔH of the convex part maximum height of the lenses was set to 1.5 μm.

Further, about 30 mm square on the plate of the random microlens array was designed as a microlens array region. Furthermore, about 400 μm square in the microlens array region was designed as a unit region. The unit regions were arranged in a lattice pattern in the microlens array region.

Using the exposure data based on the above settings and design, the exposure step S1, the developing step S2, the first electroforming step S3, and the second electroforming step S3 were performed to thereby obtain a stamper. A microlens array composed of concave lenses was formed on this stamper. Then, using this stamper, the molding step S4 was performed to obtain a random microlens array.

In Example 2-1, the distance between the random microlens array and the mat plate was 1 mm. This mat plate had a diffusion angle of 5°.

In Example 2-2, the distance between the random microlens array and the uniform microlens array was 1 mm. This uniform microlens array includes a plurality of microlenses each having a rectangular bottom surface. The plurality of microlenses were arranged at a pitch Px of 20 μm in the X direction and a pitch Py of 37 μm in the Y direction. The lens radius of curvature was 58.5 μm.

Comparative Example 2-1 is related to a single diffuser plate composed of a random microlens array having the same configuration as that of the random microlens array used in Example 2-1 and Example 2-2. Comparative Example 2-2 is related to a composite diffuser plate formed by arranging two uniform microlens arrays. The two uniform microlens arrays have the same configurations as that of the uniform microlens array 30 (see FIG. 11). Unlike the composite diffuser plate disclosed in Patent Literature 3, the two uniform microlens arrays are arranged without the angles being aligned with vertexes of the microlenses.

Figure 13:
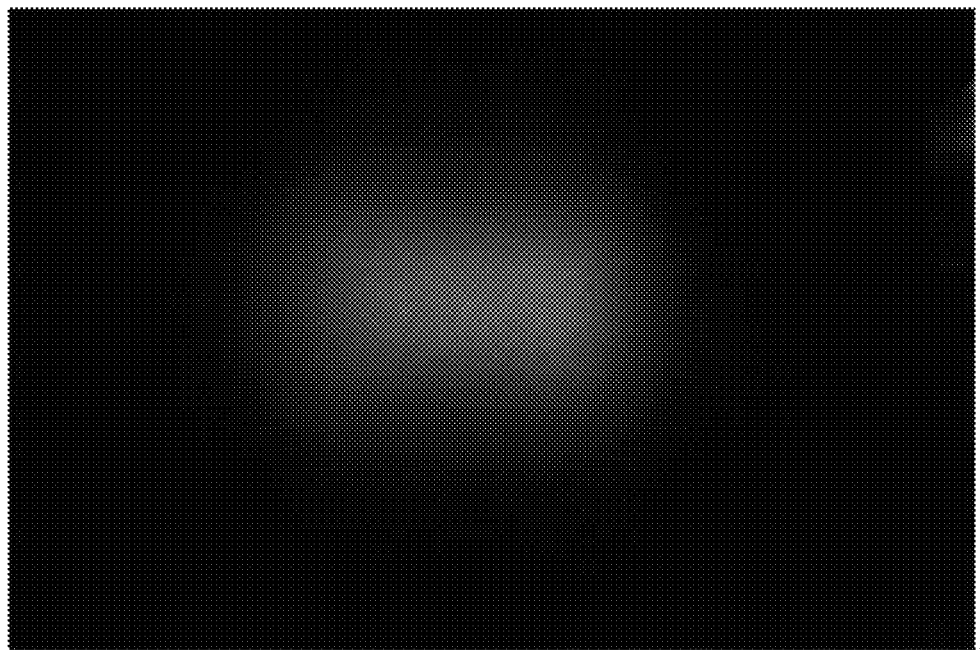
FIG. 13 is a photograph showing an example of a transmission image of the composite diffuser plate according to Example 2-1.
Figure 14:
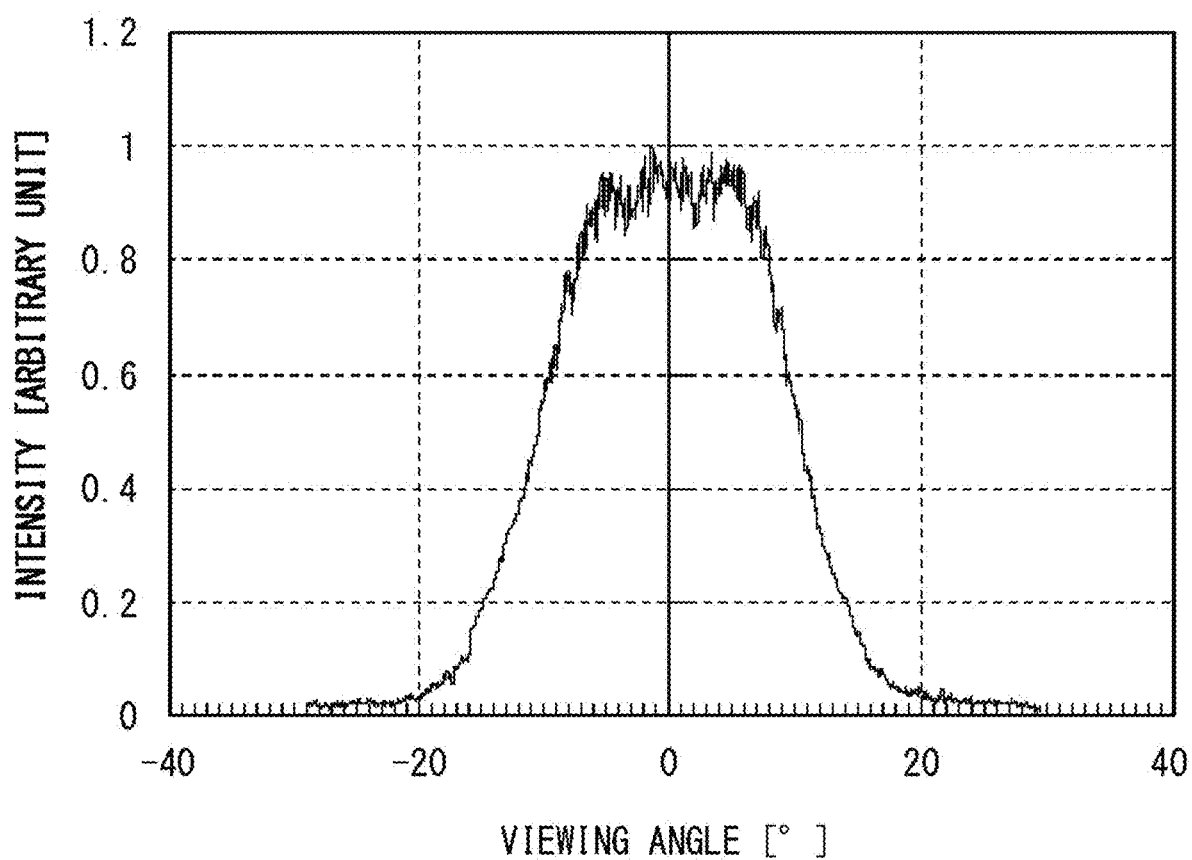
FIG. 14 is a graph showing an intensity with respect to the viewing angle of the example of the transmission image of the composite diffuser plate according to Example 2-1.
Figure 15:
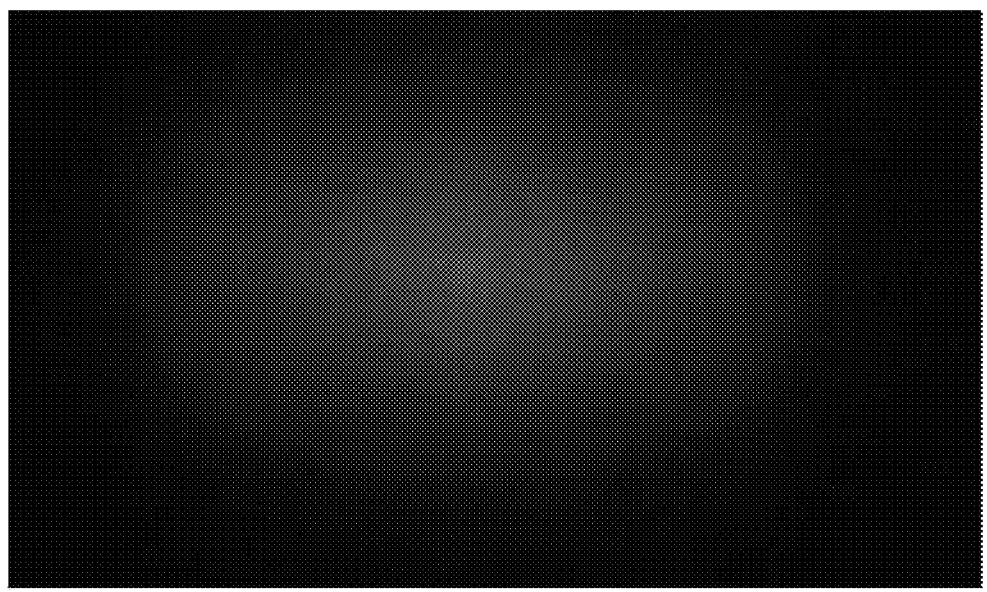
FIG. 15 is a photograph showing an example of a transmission image of a composite diffuser plate according to Example 2-2.
Figure 16:
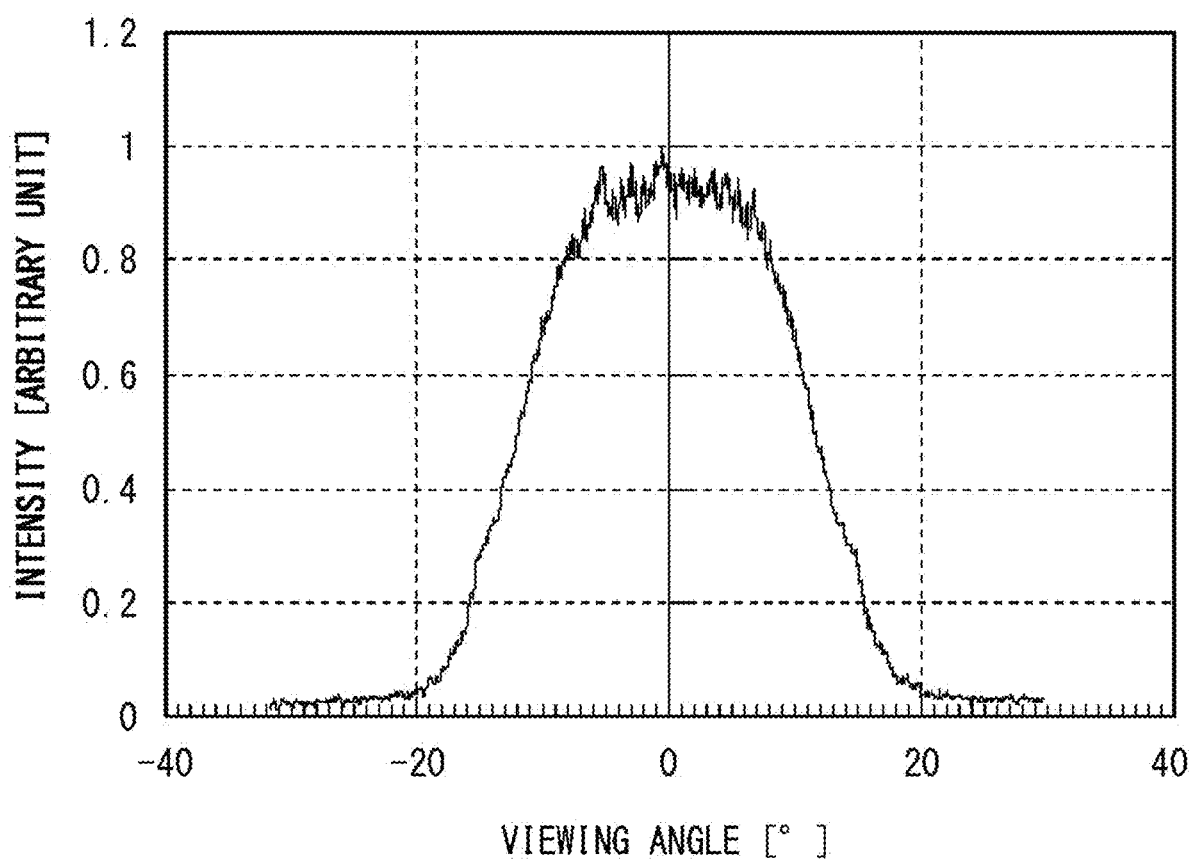
FIG. 16 is a graph showing an intensity with respect a the viewing angle of the example of the transmission image of the composite diffuser plate according to Example 2-2.
Figure 19:
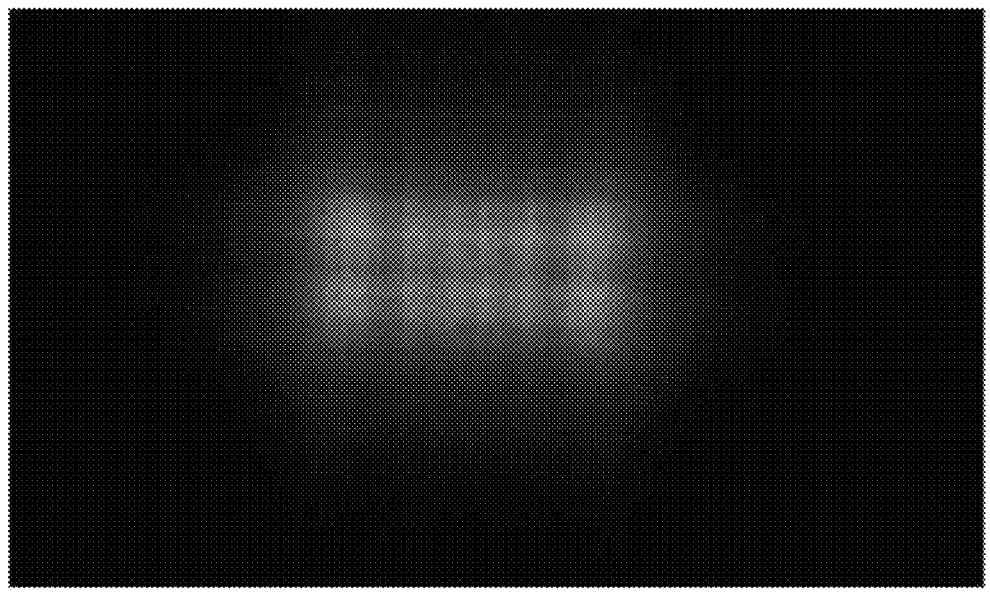
FIG. 19 is a photograph showing an example of a transmission image of a single diffuser plate.
Figure 20:
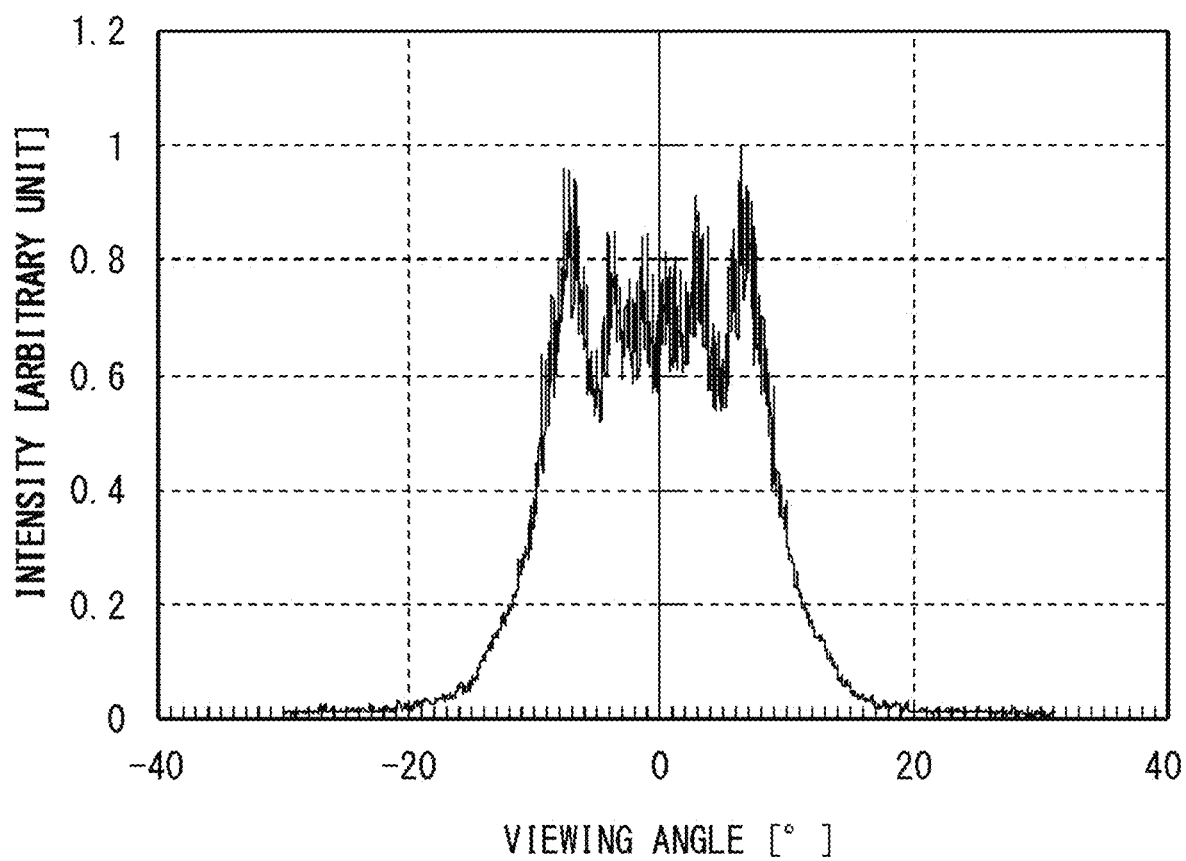
FIG. 20 is a graph showing an intensity with respect to a viewing angle of the example of the transmission image of the single diffuser plate.
Figure 21:
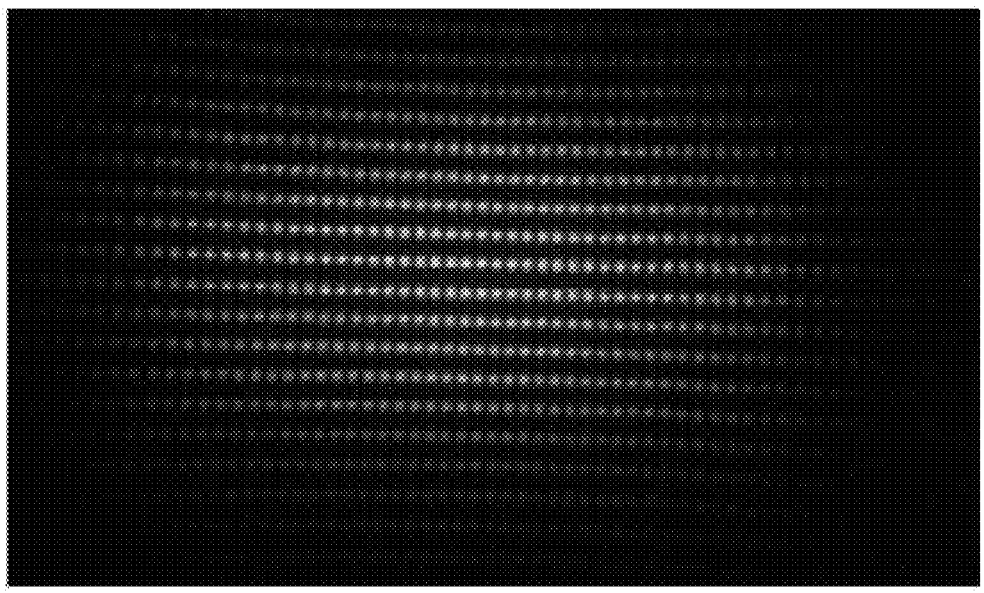
FIG. 21 is a photograph showing an example of a transmission image of a composite diffuser plate.
Figure 22:
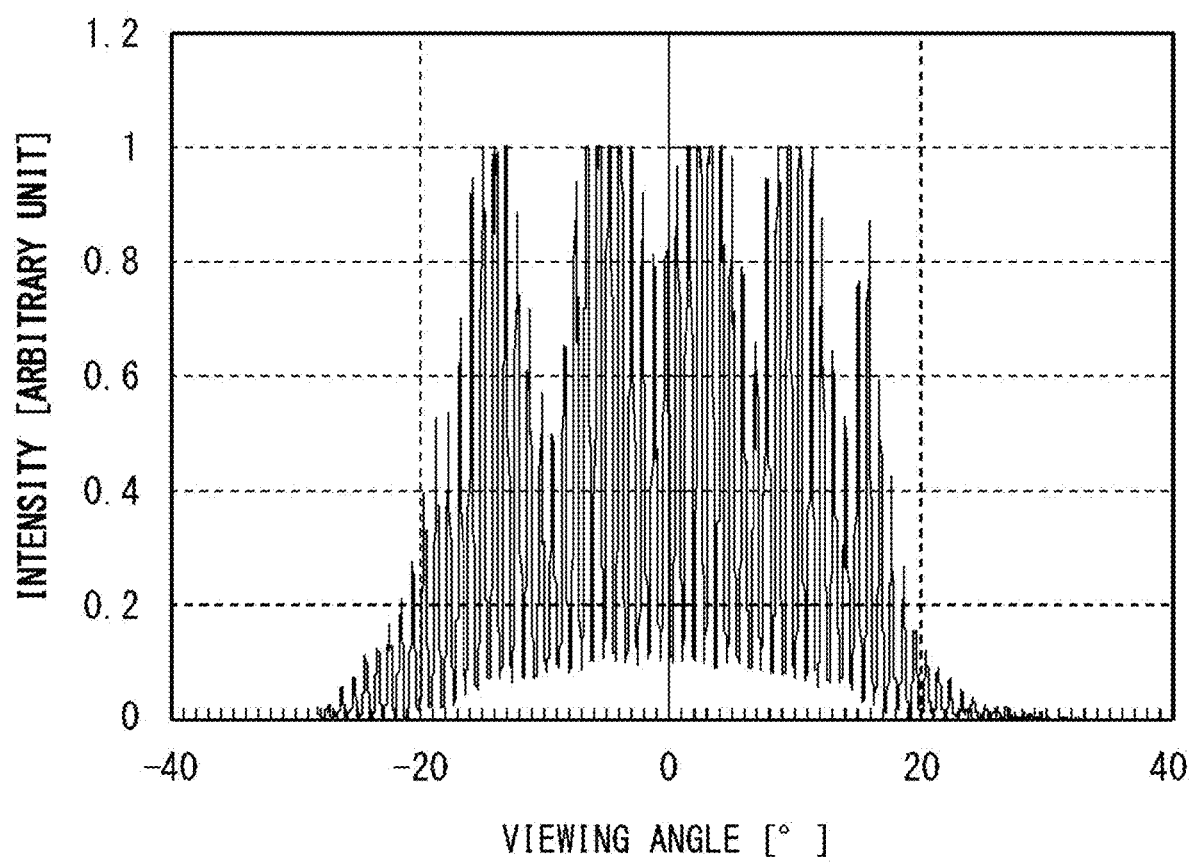
FIG. 22 is a graph showing an intensity with respect to a viewing angle of the example of the transmission image of the composite diffuser plate.

The diffuser plates according to Example 2-1, Example 2-2, Comparative Example 2-1, and Comparative Example 2-2 were irradiated with a He—Ne laser beam. The transmission images of the He—Ne laser beam were photographed. Then, the intensity with respect to the viewing angle was measured. FIGS. 13 and 14 show a transmission image of Example 2-1 and the intensity with respect to the viewing angle thereof, respectively. FIGS. 15 and 16 show a transmission image of Example 2-2 and the intensity with respect to the viewing angle thereof, respectively. FIGS. 19 and 20 show a transmission image of Comparative Example 2-1 and the intensity with respect to the viewing angle thereof, respectively. FIGS. 21 and 22 show a transmission image of Comparative Example 2-2 and the intensity with respect to the viewing angle thereof, respectively.

As shown in FIGS. 19 and 20, in the transmission image of Comparative Example 2-1, the luminance is greatly fluctuated in a central part, specifically, the viewing angles between −5° and 5°. That is, luminance is locally uneven. It is presumed that this luminance unevenness is caused by the diffraction phenomenon and the interference phenomenon and could not have been sufficiently corrected by the raised height random microlens array alone.

As shown in FIGS. 13 and 14, the transmission image of Example 2-1 has smaller luminance unevenness at the central part than the transmission image of Comparative Example 2-1 (see FIGS. 19 and 20). This is presumed to be because the mat plate having an effect of diffusing light inhibited the luminance unevenness from occurring locally.

As shown in FIGS. 15 and 16, the transmission image of Example 2-2 has smaller luminance unevenness at the central part than the transmission image of Comparative Example 2-1 (see FIGS. 19 and 20). This is presumed to be because the uniform microlens array having an effect of diffusing light inhibited the luminance unevenness from occurring locally.

As shown in FIGS. 21 and 22, the transmission image of Comparative Example 2-2 has large luminance unevenness entirely than the transmission image of Comparative Example 2-1 (see FIGS. 19 and 20). In Comparative Example 2-2, the two uniform microlens arrays were arranged without aligning the angles with respect to the vertexes of the microlenses. The large luminance unevenness is presumed to be because of this.

Incidentally, Patent Literature 2 discloses a single diffuser plate. In this single diffuser plate, a rough surface formed of a fine contoured structure is provided on a rear side of a microlens array. This microlens array is disposed in such a way that the rough surface will be on a light source side of a liquid crystal display. However, as compared with this single diffuser plate, the composite diffuser plates according to the above-described embodiments can further inhibit luminance unevenness that occurs due to diffraction.

Patent Literature 3 discloses a composite diffuser plate. This composite diffuser plate aims to reduce luminance unevenness by shifting the angles of the vertexes of the microlenses in the microlens array from the angles of the vertexes of the microlenses in another microlens array by a certain angle. Patent Literature 4 discloses a composite diffuser plate. This composite diffuser plate aims to reduce luminance unevenness by reducing lens intervals of a microlens array on an incident side to an integral multiple of those of a microlens array on an emission side. Patent Literature 5 and Non Patent Literature 1 disclose composite diffuser plates. Each of these composite diffuser plates aims to reduce luminance unevenness by arranging two microlens arrays at a focal length distance. However, unlike the composite diffuser plates disclosed in Patent Literature 5 and Non Patent Literature 1, the composite diffuser plates according to the above-described embodiments can inhibit luminance unevenness from occurring locally without limiting the method of arranging a plurality of diffuser plates in particular. Especially in Non Patent Literature 1, the alignment tolerances of the microlens arrays are very tight. Specifically, ±0.5 μm for the distance between the two microlens arrays, and ±3 mdeg for the vertexes of the microlenses of the two microlens arrays. Therefore, it is extremely difficult to position the microlens arrays in a case where they are mounted on a product such as a head-up display. Additionally, members may be deformed or positions to which the microlens arrays are attached may vary due to changes in the operating temperature and humidity environment of the head-up display. Accordingly, the alignment may be outside of the tolerances to thereby possibly generate luminance unevenness.

Note that the present disclosure is not limited to the above embodiments, and various modifications can be made without departing from the scope thereof.

For example, in the composite diffuser plate according to the first embodiment, the random microlens array is disposed on the incident side and the mat plate is disposed on the emission side. Alternatively, the mat plate may be disposed on the incident side and the random microlens array may be disposed on the emission side. Further, the random microlens array includes the microlenses on the main surface on the emission side. Alternatively, the microlenses may be disposed on the main surface on the incident side.

For example, in the composite diffuser plate according to the second embodiment, the random microlens array is disposed on the incident side, and the uniform microlens array is disposed on the emission side. Alternatively, the uniform microlens array may be disposed on the incident side, and the random microlens array may be disposed on the emission side. In addition, it is preferable that the uniform microlens array be disposed on the incident side, and the random microlens array be disposed on the emission side. This is because diffraction is less likely to occur in the random microlens array than in the uniform microlens array. Thus the luminance unevenness can be further inhibited. Further, the random microlens array includes the microlenses on the main surface on the emission side. Alternatively, the microlenses may be provided on the main surface on the incident side. Furthermore, the uniform microlens array includes the microlenses on the main surface on the emission side. Alternatively, the microlenses may be provided on the main surface on the incident side.

REFERENCE SIGNS LIST 100, 200, 300 COMPOSITE DIFFUSER PLATE
10 RANDOM MICROLENS ARRAY
11 PLATE
12 MICROLENS
12a, 12b, 12c MICROLENS
12aa, 12ba, 12ca LENS PART
12ab, 12bb, 12cb RAISED PART
20 MAT PLATE
21 PLATE BODY
22 MICRO CONTOURED PATTERN
30 UNIFORM MICROLENS ARRAY
31 PLATE
32 MICROLENS
220 UNIFORM MICROLENS ARRAY
320 REFLECTION PLATE
323 MIRROR
P1, P2 INFLECTION POINT

The invention claimed is:

1. A composite diffuser plate, comprising a first diffuser plate and a second diffuser plate arranged in this order from an incident side,
wherein:
the first diffuser plate comprises a random microlens array comprising a plurality of microlenses;
the plurality of microlenses include a plurality of parameters defining a lens shape;
at least one of the plurality of parameters is randomly distributed;
the random microlens array causes a phase difference to be generated in transmitted light;
diffused light intensity of the first diffuser plate is distributed along a top hat-shaped distribution curve having an ascending part with an inflection point P1 and a descending part with an inflection point P2;
diffused light intensity of the composite diffuser plate is distributed along a top hat-shaped distribution curve having an ascending part with an inflection point P3 and a descending part with an inflection point P4;
a top width of the first diffuser plate is a width between the inflection points P1 and P2;

a top width of the composite diffuser plate is a width between the inflection points P3 and P4; and the top width of the composite diffuser plate is less than or equal to 1.200 times the top width of the first diffuser plate, wherein the first diffuser plate and the second diffuser plate are separated by a hollow space at a predetermined distance.

2. The composite diffuser plate according to claim 1, wherein:

a diffusion angle of the first diffuser plate is greater than or equal to a diffusion angle of the second diffuser plate.

3. The composite diffuser plate according to claim 2, wherein the second diffuser plate comprises a mat plate including a micro contoured pattern on a main surface thereof and the micro contoured pattern is not formed by microlenses.

4. The composite diffuser plate according to claim 2, wherein:

the second diffuser plate comprises a uniform microlens array; and the uniform microlens array is formed by arranging a plurality of microlenses having substantially the same shape at substantially the same intervals.

5. The composite diffuser plate according to claim 1, wherein the random microlens array comprises a plate and the plurality of microlenses disposed on a main surface of the plate;

the microlens comprises a lens part and a raised part that raises the lens part from the plate;

each of a plurality of the lens parts of the respective plurality of microlenses leas substantially the same length in a convex direction;

heights of raise of a plurality of the raised parts of the respective plurality of microlenses are distributed within a predetermined range;

the microlens has a convex part maximum height, the convex part maximum height being a sum of a height of the lens part and a height of the raised part; and a maximum height difference $\Delta H$ [μm] of the convex part maximum height of the plurality of microlenses, a refractive index n of a material forming the microlenses, and a wavelength $\lambda$ [nm] of a light source satisfy:

$$0.2 \leq 1000 \times \Delta H \times (n-1)/\lambda.$$

6. The composite diffuser plate according to claim 1, further comprising a reflection part, wherein the reflection part is installed on a main surface opposite to the incident side of the second diffuser plate.

7. The composite diffuser plate according to claim 1, wherein the predetermined distance is shorter than a focal length of the microlens.

8. The composite diffuser plate according to claim 1, wherein the predetermined distance is longer than a focal length of the microlens.

9. The composite diffuser plate according to claim 1, wherein a rate of change in the top width of the composite diffuser ranges from 1.006 to 1.200.

* * * * *